US011847127B2

United States Patent
Iliev et al.

(10) Patent No.: US 11,847,127 B2
(45) Date of Patent: Dec. 19, 2023

(54) DEVICE AND METHOD FOR DISCOVERING CAUSAL PATTERNS

(71) Applicant: TOYOTA RESEARCH INSTITUTE, INC., Los Altos, CA (US)

(72) Inventors: Rumen Iliev, Millbrae, CA (US); Totte Harri Harinen, San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 32 days.

(21) Appl. No.: 17/318,701

(22) Filed: May 12, 2021

(65) Prior Publication Data

US 2022/0365926 A1 Nov. 17, 2022

(51) Int. Cl.
*G06F 16/2458* (2019.01)
*G06F 16/28* (2019.01)
*G06F 16/2457* (2019.01)

(52) U.S. Cl.
CPC .... *G06F 16/2465* (2019.01); *G06F 16/24578* (2019.01); *G06F 16/284* (2019.01)

(58) Field of Classification Search
None
See application file for complete search history.

(56) References Cited

U.S. PATENT DOCUMENTS

| | | | |
|---|---|---|---|
| 9,262,772 | B2 | 2/2016 | Stivoric et al. |
| 9,785,755 | B2 | 10/2017 | Riabov et al. |
| 9,820,680 | B2 | 11/2017 | Muzet |
| 10,426,380 | B2 | 10/2019 | Schindhelm et al. |

(Continued)

FOREIGN PATENT DOCUMENTS

| | | |
|---|---|---|
| CN | 108510075 A | 9/2018 |
| WO | 2020034198 A1 | 2/2020 |
| WO | WO-2021092099 A1 * | 5/2021 |

OTHER PUBLICATIONS

Byung Hyung Kim et al.;"Wearable Affective Life-Log System for Understanding Emotion Dynamics in Daily Life"; Nov. 2019' 13 pgs; (https://arxiv.org/pdf/1911.01072.pdf).

*Primary Examiner* — Alex Gofman
*Assistant Examiner* — Umar Mian
(74) *Attorney, Agent, or Firm* — DINSMORE & SHOHL LLP (57) ABSTRACT

A method of identifying causal relationships includes receiving data comprising a set of values corresponding to one or more variables, and generating a list of candidate causal models of relationships between or within the variables. The list is ranked based on a likelihood of each candidate causal model, wherein the likelihood includes at least a correlation value. The method further includes receiving feedback identifying a candidate causal model and a change in rank of the candidate causal model, re-ranking the list based on the feedback, and displaying the re-ranked list. The method generates an intervention comprising a suggested modification corresponding to a variable of a selected causal model among the candidate causal models in the re-ranked list, receives additional data corresponding to the variable of the suggested modification and evaluates the additional data to determine whether the likelihood of the selected causal model has changed.

12 Claims, 4 Drawing Sheets

(56) References Cited

U.S. PATENT DOCUMENTS

| | | | | |
|---|---|---|---|---|
| 2005/0049988 | A1* | 3/2005 | Dahlquist | G05B 23/0278 |
| | | | | 706/46 |
| 2011/0307437 | A1* | 12/2011 | Aliferis | G06N 20/00 |
| | | | | 706/46 |
| 2014/0289174 | A1* | 9/2014 | Statnikov | G06N 5/04 |
| | | | | 706/12 |
| 2015/0074035 | A1* | 3/2015 | Narasappa | G06N 7/005 |
| | | | | 706/52 |
| 2015/0339415 | A1* | 11/2015 | Klein | G06F 30/20 |
| | | | | 703/6 |
| 2016/0292248 | A1* | 10/2016 | Garcia | G06Q 10/063 |
| 2018/0064397 | A1 | 3/2018 | Horikawa et al. | |
| 2018/0336349 | A1* | 11/2018 | Zhang | G06F 21/554 |
| 2018/0366024 | A1* | 12/2018 | Yom-Tov | G09B 19/00 |
| 2019/0302734 | A1* | 10/2019 | Agarwal | G05B 19/4097 |
| 2020/0160189 | A1* | 5/2020 | Bhattacharjya | G06F 16/9024 |
| 2020/0279417 | A1* | 9/2020 | Lee | G06K 9/00 |
| 2021/0141842 | A1* | 5/2021 | Pol | G06F 40/20 |
| 2021/0256406 | A1* | 8/2021 | Mueller | G06K 9/6226 |
| 2021/0311996 | A1* | 10/2021 | Bonin | G06F 16/9035 |
| 2022/0114417 | A1* | 4/2022 | Dalli | G06N 5/045 |

* cited by examiner

DEVICE AND METHOD FOR DISCOVERING CAUSAL PATTERNS

TECHNICAL FIELD

The present specification generally relates to methods of identifying causal patterns in data and, more specifically, a device and method for assisting users in evaluating complex data and identifying causality where such causality is not immediately apparent to a human and not identifiable through computational methods alone.

BACKGROUND

The disclosed embodiments provide a device and methods of interacting with users to discover causal patterns in their everyday lives, which can enable users to make decisions and behavioral modifications that lead to better health, productivity, and well-being.

Causality is the influence by which one event, process, state, or object (a cause) contributes to the production of another event, process, state, or object (an effect) where the cause is at least partly responsible for the effect, and the effect is at least partly dependent on the cause. In general, a process or event has many causes, which are also said to be causal factors for it, and all lie in its past. Causation is not equivalent to correlation, although correlation can often be found associated with causation. Although correlation between two events can be determined through statistical methods, causality can be difficult to determine through mathematical methods. Traditional approaches require humans to self-determine causality.

Generally, humans are excellent at making causal inferences based on existing mental models (e.g., what will happen if one stops eating for a month). However, human cognition is not well equipped to make causal inferences based on frequency information and statistical patterns (e.g., what causes one's occasional headaches). This is particularly true when the causality is based on multiple necessary conditions (e.g., headaches appear only when not having sunglasses on a sunny day and being moderately dehydrated) or when an effect is significantly removed in time from the cause.

Accordingly, a need exists for a device and methods for assisting users in evaluating complex data and identifying causality where such causality is not immediately apparent to a human and not identifiable through computational methods alone.

SUMMARY

In one embodiment, a method for identifying a causal relationship in data may include receiving data corresponding to one or more variables. The data may include a set of values corresponding to each variable. The method may further include generating a list of candidate causal models of relationships between variables or within variables, and ranking the list based on a likelihood of each candidate causal model. The likelihood may include a correlation value. The method may further include receiving feedback identifying a candidate causal model and a change in rank of the candidate causal model, re-ranking the list based on the feedback, and displaying the re-ranked list.

In another embodiment, the generating of the list of candidate causal models may include performing statistical analysis on the data to identify candidate causal models.

In yet another embodiment, the method for identifying a causal relationship in data may include receiving input identifying a variable for which a candidate causal model of a relationship is to be identified. The input identifying the variable may include identification of an event in the set of values corresponding to the identified variable, and the performing of the statistical analysis may include identifying one or more correlations between the identified event and at least one other event or variable.

In yet another embodiment, the generating of the list of candidate causal models may further include performing time-series analysis, potential outcome framework, counterfactual framework, and social network analysis on the data to identify candidate causal models.

In yet another embodiment, the method for identifying a causal relationship in data may include generating an intervention comprising a suggested modification corresponding to a variable of a selected causal model among the candidate causal models in the re-ranked list.

In yet another embodiment, the method for identifying a causal relationship in data may include receiving additional data corresponding to the variable of the suggested modification, evaluating the additional data to determine whether the likelihood of the selected causal model has changed, and displaying a report of a result of the evaluation of the additional data.

In yet another embodiment, the likelihood may further include the correlation value weighted by an explanatory score.

Other embodiments include a computer readable memory storing instructions that cause a processor to perform the method steps and a computer device that performs the method steps.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 2:
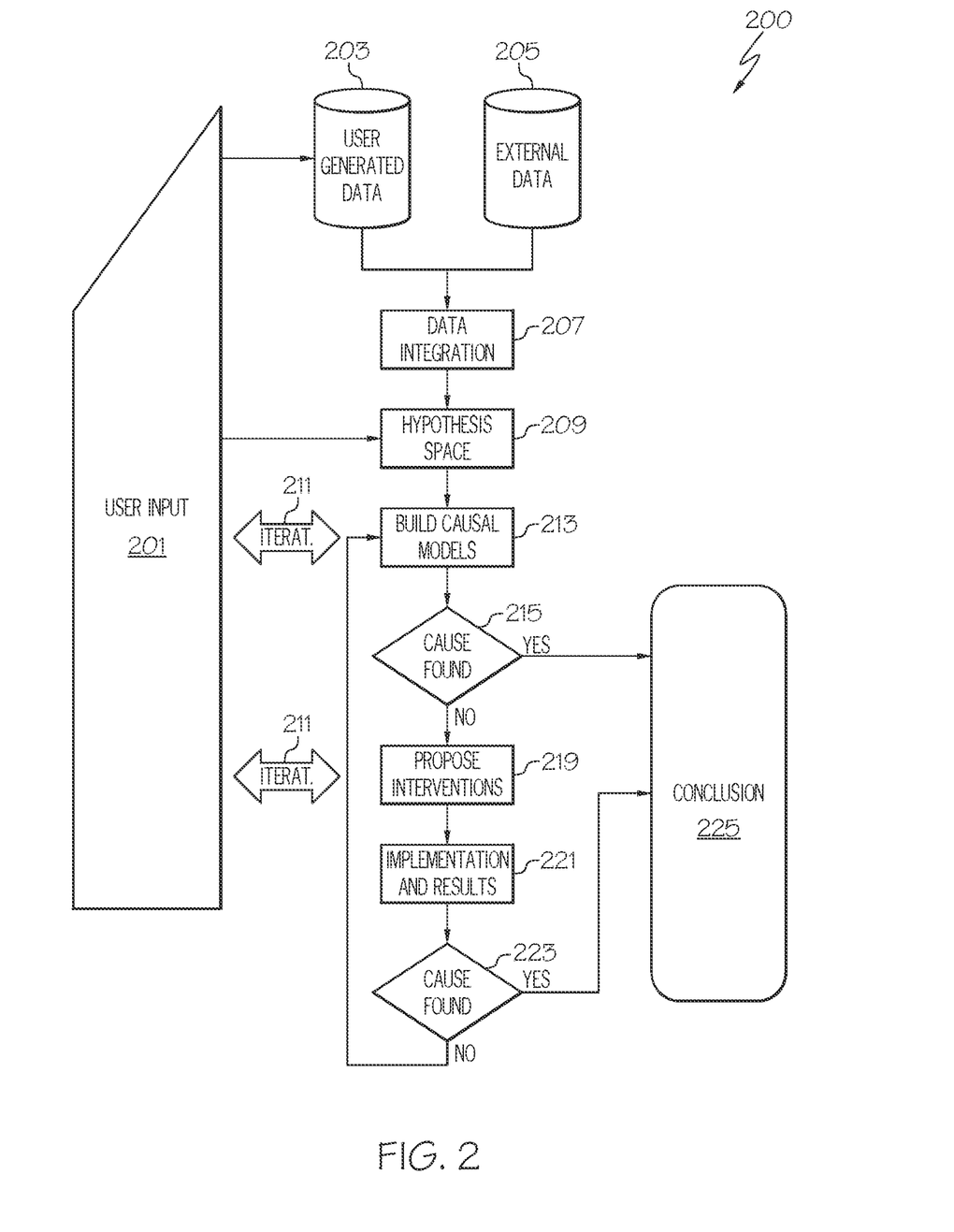
FIG. 2 depicts a flow chart of a method for identifying causal relationships according to one or more embodiments shown and described herein.

The disclosed embodiments provide a computing device and methods for assisting users in identifying causal relationships in their everyday lives. By taking advantage of the computing device's superior power in statistical analysis and human feedback for identification of potential causal mechanisms, the disclosed device and methods enable identification of causal relationships that elude detection of computing devices and humans individually. Although the disclosed methods are described in relation to identifying causal relationships in the everyday lives of users, it will be understood that the device and methods are applicable to assisting humans in identifying causal relationships in any data, regardless of the source. FIG. 2 depicts a flow chart of a process for analyzing data, using human feedback to identify a potential causal relationship, and verifying the causal relationship by proposing an intervention and analyzing additional data gathered in relation to the proposed intervention. Various aspects of the computing device and the associated methods will be described in more detail herein.

Figure 1:
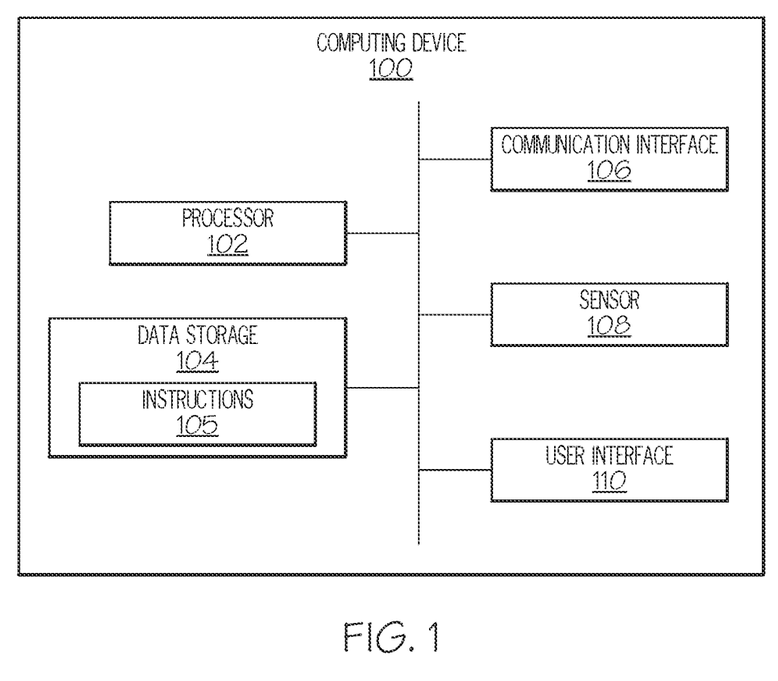
FIG. 1 depicts a block diagram of a computing device, according to one or more embodiments shown and described herein.

FIG. 1 depicts a block diagram of a computing device, according to one or more embodiments shown and described herein. As shown, a computing device 100 may include a processor 102, and data storage 104 including instructions 105. The computing device may further include a communication interface 106, a sensor 108, and a user interface 110, each of which are communicatively connected via a system bus 112. Any component or combination of components of the disclosed embodiments may take the form of or include a computing device 100. It should be understood that computing device 100 may include different and/or additional components, and some or all of the functions of a given component could instead be carried out by one or more different components. Computing device 100 may take the form of (or include) a virtual computing device or one or more computing resources in a cloud computing environment. Additionally, computing device 100 could take the form of (or include) a plurality of computing devices of any form, and some or all of the functions of a given component could be carried out by any combination of one or more of the computing devices in the plurality.

The processor 102 may take the form of one or more general-purpose processors and/or one or more special-purpose processors, and may be integrated in whole or in part with data storage 104, communication interface 106, sensor 108, user interface 110, and/or any other component of computing device 100, as examples. Accordingly, the processor 102 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

The data storage 104 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

The instructions 105 may be stored in the data storage 104, and may include machine-language instructions executable by the processor 102 to cause the computing device 100 to perform the computing-device functions described herein. Additionally or alternatively, the instructions 105 may include script instructions executable by a script interpreter configured to cause the processor 102 and the computing device 100 to execute the instructions specified in the script instructions. According to some embodiments, the instructions include instructions executable by the processor to cause the computing device to execute an artificial neural network. It should be understood that the instructions 105 may take other forms as well.

Additional data may be stored in the data storage 104, in a data format such as databases, data structures, data lakes, and/or network parameters of a neural network. The additional data could be stored in a data format such as a table, a flat file, data in a file system of the data storage, a heap file, a B+ tree, a hash table, a hash bucket, or any combination of these, as examples.

The communication interface 106 may be any component capable of performing the communication-interface functions described herein, including facilitating wired and/or wireless communication between the computing device 100 and another entity. As such, the communication interface 106 could take the form of an Ethernet, Wi-Fi, Bluetooth, and/or USB interface, among many other examples. The communication interface 106 may receive data over a network via communication links, for instance.

The sensor 108 could take the form of one or more sensors operable to perform any of the sensor functions described herein. The sensor 108 could be positioned in a wearable device of the user, in a mobile device of the user, in a vehicle of the user, or in any device of the user or location in the environment of the user. Though the sensor 108 may be referenced in the singular throughout this disclosure, it should be understood that the sensor 108 may take the form of (or include) a single sensor or multiple sensors.

The user interface 110 may be any component capable of carrying out the user-interface functions described herein. For example, the user interface 110 may be configured to receive input from a user and/or output information to the user. Output may be provided via a computer monitor, a loudspeaker (such as a computer speaker), or another component of (or communicatively linked to) the computing device 100. User input might be achieved via a keyboard, a mouse, or other component communicatively linked to the computing device. As another possibility, input may be realized via a touchscreen display of the computing device in the form of a smartphone or tablet device. Some components may provide for both input and output, such as the aforementioned touchscreen display. It should be understood that the user interface 110 may take numerous other forms as well.

The system bus 112 may be any component capable of performing the system bus 112 functions described herein. In an embodiment, the system bus 112 may be any component configured to transfer data between the processor 102, the data storage 104, the communication interface 106, the sensor 108, the user interface 110, and/or any other component of the computing device 100. In an embodiment, the system bus 112 includes a traditional bus as is known in the art. In other embodiments, the system bus 112 includes a serial RS-232 communication link, a USB communication link, and/or an Ethernet communication link, alone or in combination with a traditional computer bus, among numerous other possibilities. In some examples, the system bus 112 may be formed from any medium that is capable of transmitting a signal, such as conductive wires, conductive traces, or optical waveguides, among other possibilities. Moreover, the system bus 112 may be formed from a combination of mediums capable of transmitting signals. The system bus 112 could take the form of a system interconnect, a personal area network, a local area network, or any combination of these or mediums. It should be understood that the system bus 112 may take various other forms as well.

In the disclosed embodiments, the network may include one or more computer networks (e.g., a personal area network, a local area network, grid computing network, wide area network, etc.), cellular networks, satellite networks, the internet, a virtual network in a cloud computing environment, and/or any combinations thereof. Accordingly, the components of the device may be communicatively coupled to the network via a wide area network, via a local area network, via a personal area network, via a cellular network, via a satellite network, via a cloud network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB, Serial ATA, eSATA, and FireWire. Suitable cellular networks include, but are not limited to, technologies such as LTE, WiMAX, UMTS, CDMA, and GSM. Accordingly, the network can be utilized as a wireless access point by the device to access one or more servers.

FIG. 2 depicts a flow chart of a method for identifying causal relationships according to one or more embodiments shown and described herein. Referring now to FIG. 2, the method 200 operates on data related to an event or process for which a causal relationship is to be identified. Data may include a set of values corresponding to one or more variables. Variables may comprise any type of variable without limitation. A variable may also comprise a time, a location, or a sequence. Variables may be objectively measured, or subjectively evaluated. An event may be defined as a change in a variable, a particular value, a set of values, or a range of values the variable takes, or a threshold the variable exceeds. A causal relationship may exist and be identified between events in values corresponding to a single variable, between two different variables, or between one variable and multiple other variables. Not all data may be relevant to a causal relationship, and it is not necessary to limit data only to those variables that have a causal relationship with each other. One of ordinary skill in the art will recognize that any variable or event may be used without limitation.

Data may comprise user generated data 203 and external data 205. User generated data 203 may be collected from devices or sensors related to the user or received from user input 201, including spreadsheets or user answers to questions. The user generated data 203 and external data may be stored remotely and accessed via a network. User generated data 203 from devices or sensors may include data gathered from wearable devices, mobile devices, online interactions, sensors in the user's environment, or any other source of data considered relevant to the user, the user's behavior, or the user's environmental conditions. External data 205 may comprise weather information, social media, news feeds, traffic information, air quality, or other users of the device who may share exposure to common stimuli such as political, social, or economic events.

User generated data 203 and external data 205 may be integrated in a data integration 207 step. Data integration 207 may comprise combining, filtering and sorting data. For example, external data corresponding to a different geographic region from the user's geographic region may be considered irrelevant and filtered out. Redundant data may also be filtered out. For example, weather data from sensors in the user's environment may be redundant with weather data from the external data 205. The description of data sources and data integration is not intended to be limiting, and any data source or combination of data sources may be used without departing from the spirit and scope of the disclosed embodiments.

A hypothesis space 209 may be generated based on the user generated data and external data. The hypothesis space 209 defines the scope of the causal relationship that is to be identified. This scope may range from a specific event such as headaches, to more general and complex phenomena such as general well-being or satisfaction with work or personal relationships. The hypothesis space 209 is potentially unlimited and may be constrained based on user input 201. For example, the user may provide limits on the strength of a correlation that is considered part of the hypothesis space. In some instances, the hypothesis space may be naturally limited based on the user generated data 203 provided by the user, which may be motivated by events the user desires to explain, such as headaches, or general well-being. The hypothesis space 209 may define a set of variables that are considered relevant to the causal relationship that is to be identified. For example, if a user seeks to identify a cause of occasional headaches, variables related to diet, sleep, and air quality may be included in the hypothesis space.

Based on the hypothesis space 209, the device may build a list of causal models 213 through a first iterative process 211 of receiving user input 201. Causal models 213 may comprise a set of candidate causal models generated based on statistical analysis of the variables in the hypothesis space. These candidate causal models 213 may be displayed to the user, and user input 201 may be received to identify a causal model and a change in rank of the identified causal model. User input may also identify a causal model to be eliminated from the causal models 213. This process is iterated until user input 201 is received that indicates the set of candidate causal models and their ranked order are acceptable. This process of building candidate causal models 213 and re-ranking the candidate causal models through iterative feedback from the user is described in greater detail in relation to FIG. 3.

At step 215, if a cause is found, the process moves to the conclusion 225 and the identified cause is displayed to the user. A cause may be found, for example, if a strong correlation exists between events represented in the hypothesis space and user input 201 indicates a candidate cause is sufficiently likely to be the actual cause. As a non-limiting example, a user may experience occasional headaches on weekends. Upon analyzing data related to diet, physical activity, and frequency of headaches, the device may generate a model of caffeine intake in relation to headaches that indicates a strong correlation between reduced caffeine intake and increased headaches. The user may recognize that their caffeine intake is interrupted on the weekends and identify that interruption in caffeine intake as the most likely cause of weekend headaches. The determination that a cause is found at step 215 may be performed based on both data analysis and user input 201.

If a cause is not found at step 215, the device may propose interventions 219 designed to help identify a causal relationship or the cause of an identified event in the user generated data 203. A proposed intervention may include a suggested change to behavior that is expected to produce a corresponding change in the event or events for which the user seeks to identify a cause. There may be multiple candidate causal models, and multiple separate interventions proposed. The device may propose interventions and receive user input 201 through a second iterative process 217 until an intervention is identified as acceptable by the user input 201. The process of generating an intervention is described in greater detail in relation to FIG. 4 below.

The device may then gather data on the implementation and results 221 of the proposed intervention. As the device receives additional data that includes a change to a variable corresponding to the proposed intervention 219, the correlation corresponding to the candidate causal model and proposed intervention may be confirmed or disconfirmed. In response to confirming the correlation of the candidate causal model based on the additional data gathered through implementation and results 221, the device may determine that a cause is found at step 223 and proceed to the conclusion where the resulting cause is displayed to the user.

If a cause is not found at step 223, the device may return to building causal models 213 and may build a list of causal models 213 through the first iterative process 211 of receiving user input 201 to identify and rank a list of candidate causal models 213.

Figure 3:
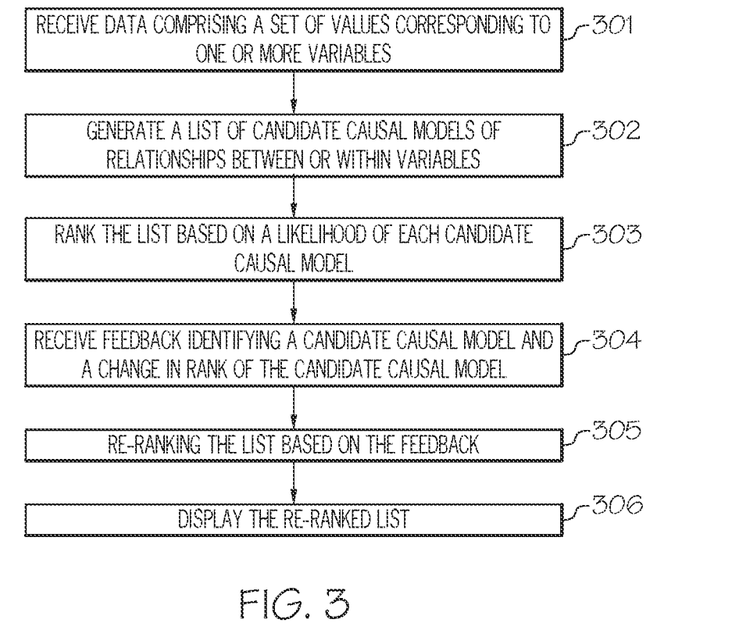
FIG. 3 depicts a flow chart of method steps for generating a ranked list of candidate causal models according to one or more embodiments shown and described herein.

FIG. 3 depicts a flow chart of method steps for generating a ranked list of candidate causal models according to one or more embodiments shown and described herein. At step 301, the device may receive data comprising a set of values corresponding to one or more variables. A variable may comprise values that change to represent one or more events. An event may be causally related to another event of the same variable, related to an event in another variable, or related to a combination of events in any number of variables including the same variable.

At step 302, the device generates a list of candidate causal models. Candidate causal models define a relationship between variables, within a variable, or any combination thereof. The device may generate a list of candidate causal models by performing statistical analysis on the data. Statistical analysis may comprise determining a correlation value that represents the strength of correlation between events. Statistical analysis may also comprise performing time-series analysis, potential outcome framework, counterfactual framework, and social network analysis on the data to identify candidate causal models.

Generating a list of candidate causal models may comprise receiving input identifying a variable or an event for which a candidate causal model of a relationship is to be identified. The device may perform analysis on the data to determine what potential causal relationships may exist between the identified variable or event and other variables or events included in the data.

Some events that are causally related may be only weakly correlated, and some events that are not causally related may be highly correlated. Therefore, a strong correlation does not necessarily indicate a high likelihood of a causal relationship. At step 303, the device may rank the list of candidate causal models based on a likelihood of each candidate causal model. The likelihood may comprise a correlation value, and the ranking may, at least initially, be based on the correlation value. The likelihood may also comprise a weighting based on an explanatory score. As a non-limiting example, pregnancy may be only weakly correlated with sexual activity. Yet, sexual activity may have a high explanatory score in relation to pregnancy because pregnancy rarely occurs without sexual activity, for example as a result of certain medical procedures designed to result in pregnancy. As another non-limiting example, the consumption of ice cream in a population may be highly negatively correlated with hypothermia. Of course, this is because ice cream is frequently consumed in hot weather, and hypothermia tends to occur in cold weather. An erroneous interpretation may be that consumption of ice cream prevents hypothermia. However, because an alternate and shared causal mechanism (weather) exists for both ice cream consumption and hypothermia, the likelihood of causation between ice cream consumption and hypothermia reduction may have a low explanatory score weighting.

An explanatory score may be drawn from a database of known relationships. These known relationships may be populated manually, or may be learned by the device over time as causal relationships are identified, tracked, and stored in the database.

At step 304, the device may receive feedback identifying a candidate causal model and a change in rank of the candidate causal model. Once a set of candidate causal models are generated and ranked, the ranked list may be presented to the user. The user may have unique insight related to potential causal relationships. Some candidate causal models may be immediately identifiable as spurious. The device may iteratively receive feedback from the user identifying a candidate causal model in the list and changing the rank of the identified candidate causal model. User feedback may also identify candidate causal models to be removed from the list. At step 305, the device re-ranks the list based on the received feedback. This process may repeat until user input indicates the re-ranked list of candidate causal models is acceptable. This re-ranked list may represent a set of candidate causal models that represent relationships detected through data analysis and refined by user feedback. The re-ranked list does not necessarily represent a ranking from most likely to least likely. A user may express any preference for re-ranking candidate causal models, including a preference for candidate causal models that the user considers to be easily influenced.

At step 306, the final re-ranked list is displayed to the user. At this point, a causal relationship may be identified, or a causal relationship may be verified through intervention. The process of intervention is described in relation to FIG. 4.

Figure 4:
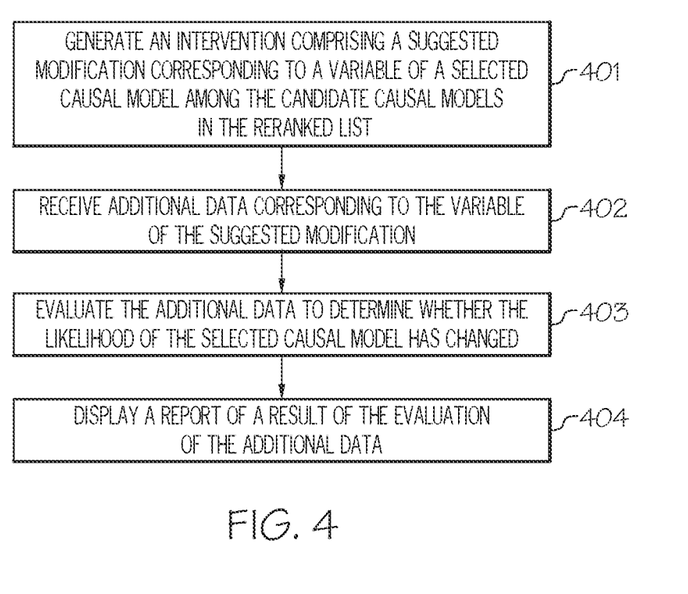
FIG. 4 depicts a flow chart of method steps for implementing an intervention and verifying a candidate causal model according to one or more embodiments shown and described herein.

FIG. 4 depicts a flow chart of method steps for implementing an intervention and verifying a candidate causal model according to one or more embodiments shown and described herein. At step 401, the device may generate an intervention comprising a suggested modification corresponding to a variable of a selected causal model among the candidate causal models in the re-ranked list. The selected causal model may be a causal model selected based on user input or a causal model automatically selected from the top of the re-ranked list generated in step 205. The suggested modification may include a suggested change to the user's behavior in relation to a variable corresponding to the selected causal model. As a non-limiting example, an intervention may include a change in the user's diet, sleep habits, exercise routine, or any combination thereof.

At step 402, the device receives additional data corresponding to the variable of the suggested modification. As the user implements the proposed intervention, for example, by making changes to their behavior, they may input additional data related to the intervention. At step 403, the device may evaluate the additional data to determine whether the likelihood of the selected causal model has changed. As a non-limiting example, if the event related to the selected causal model is eliminated in response to the change in the user's behavior, the device may conclude that the selected causal model describes an existing causal relationship.

Alternatively, if the event related to the selected causal model remains unchanged, despite changes in the additional data, as recommended by the proposed intervention, then the device may conclude that a causal relationship does not exist. The user may then proceed to identify another candidate causal model and another proposed intervention in a process of identifying a cause for a particular event.

At step 404, the device displays a report of a result of the evaluation of the additional data. The device may display an indication that the selected causal relationship is confirmed or disconfirmed.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   receiving user generated data and external data;
   integrating the user generated data and the external data, and filtering out irrelevant data and redundant data;
   generating a hypothesis space comprising a scope of a causal relationship to be identified based on the user generated data and the external data;
   generating a plurality of candidate causal models based on the hypothesis space;
   providing a ranked list of the candidate causal models;
   receiving user input identifying one or more of the candidate causal models to be removed, and removing the identified one or more candidate causal models;
   receiving input identifying a variable for which a causal model of a relationship is to be identified, and an event in a set of values corresponding to the identified variable;
   proposing one or more interventions for a first candidate model of the candidate causal models, an intervention comprising a change in a user's behavior in relation to a variable corresponding to a candidate causal model;
   receiving additional data corresponding to the variable associated with the one or more interventions;
   determining whether the event related to the first candidate model has changed based on the additional data;
   upon determination that the event related to the first candidate model is eliminated in response to the one or more interventions, determining that the first causal model describes an existing causal relationship; and
   displaying an indication of whether the first candidate model describes the existing causal relationship.

2. The method of claim 1, wherein the generating of the plurality of candidate causal models comprises:
   performing statistical analysis on the user generated data and the external data to identify, the candidate causal models.

3. The method of claim 2
   wherein performing statistical analysis comprises identifying one or more correlations between the identified event and at least one other event or variable.

4. The method of claim 1, wherein the generating of the plurality of candidate causal models further comprises:
   performing time-series analysis, potential outcome framework, counterfactual framework, and social network analysis on data to identify the candidate causal models.

5. A non-transitory computer-readable medium storing instructions that, when executed by a processor, cause the processor to perform steps comprising:
   receiving user generated data and external data;
   integrating the user generated data and the external data, and filtering out irrelevant data and redundant data;
   generating a hypothesis space comprising a scope of a causal relationship to be identified based on the user generated data and the external data;
   generating a plurality of candidate causal models based on the hypothesis space;
   providing a ranked list of the candidate causal models;
   receiving user input identifying one or more of the candidate causal models to be removed, and removing the identified one or more candidate causal models;
   receiving input identifying a variable for which a causal model of a relationship is to be identified, and an event in a set of values corresponding to the identified variable;
   proposing one or more interventions for a first candidate model of the candidate causal models, an intervention comprising a change in a user's behavior in relation to a variable corresponding to a candidate causal model;
   receiving additional data corresponding to the variable associated with the one or more interventions;
   determining whether the event related to the first candidate model has changed based on the additional data;
   upon determination that the event related to the first candidate model is eliminated in response to the one or more interventions, determining that the first causal model describes an existing causal relationship; and
   displaying an indication of whether the first candidate model describes the existing causal relationship.

6. The non-transitory computer-readable medium of claim 5, wherein the generating of the plurality of candidate causal models comprises:
   performing statistical analysis on the user generated data and the external data to identify the candidate causal models.

7. The non-transitory computer-readable medium of claim 6
   wherein performing statistical analysis comprises identifying one or more correlations between the identified event and at least one other event or variable.

8. The non-transitory computer-readable medium of claim 5, wherein the generating of the plurality of candidate causal models further comprises:
   performing time-series analysis, potential outcome framework, counterfactual framework, and social network analysis on the data to identify the candidate causal models.

9. A computing device comprising:
   a processor; and
   memory,
   wherein the memory stores instructions that, when executed, cause the processor to performs steps comprising:
   receiving user generated data and external data;
   integrating the user generated data and the extern data, and filtering out irrelevant data and redundant data;
   generating a hypothesis space comprising a scope of a causal relationship to be identified based on the user generated data and the external data;

generating a plurality of candidate causal models based on the hypothesis space;

providing a ranked list of the candidate causal models;

receiving user input identifying one or more of the candidate causal models to be removed, and removing the identified one or more candidate causal models;

receiving input identifying a variable for which a causal model of a relationship is to be identified, and an event in a set of values corresponding to the identified variable;

proposing one or more interventions for a first of the candidate causal models, an intervention comprising a change in a user's behavior in relation to a variable corresponding to a candidate causal model;

receiving additional data corresponding to the variable associated with the one or more interventions;

determining whether the event related to the first candidate model has changed based on the additional data;

upon determination that the event related to the first candidate model is eliminated in response to the one or more interventions, determining that the first causal model describes an existing causal relationship; and displaying an indication of whether the first candidate model describes the existing causal relationship.

10. The device of claim 9, wherein the generating of the plurality of candidate causal models comprises:

performing statistical analysis on the user generated data and the external data to identify the candidate causal models.

11. The device of claim 10, wherein performing statistical analysis comprises identifying one or more correlations between the identified event and at least one other event or variable.

12. The device of claim 9, wherein the generating of the plurality of candidate causal models further comprises:

performing time-series analysis, potential outcome framework, counterfactual framework, and social network analysis on the data to identify the candidate causal models.

* * * * *

UNITED STATES PATENT AND TRADEMARK OFFICE
CERTIFICATE OF CORRECTION

PATENT NO. : 11,847,127 B2
APPLICATION NO. : 17/318701
DATED : December 19, 2023
INVENTOR(S) : Rumen Iliev and Totte Harri Harinen It is certified that error appears in the above-identified patent and that said Letters Patent is hereby corrected as shown below:

In the Claims

In Column 9, Line(s) 58, Claim 3, after "claim 2", insert --,--.

In Column 10, Line(s) 42-43, Claim 7, after "claim 6", insert --,--.

Signed and Sealed this
Thirtieth Day of January, 2024

Katherine Kelly Vidal
*Director of the United States Patent and Trademark Office*